United States Patent [19]

O'Donnell

[11] Patent Number: 4,984,763
[45] Date of Patent: Jan. 15, 1991

[54] ARTICLE FOR MOUNTING OBJECTS

[76] Inventor: Patrick F. O'Donnell, 27 Main St., Andover, N.Y. 14806

[21] Appl. No.: 354,567

[22] Filed: May 22, 1989

[51] Int. Cl.⁵ .......................................... F16M 11/00
[52] U.S. Cl. ................................ 248/218.1; 248/303; 248/211
[58] Field of Search ............... 248/218.1, 218.4, 217.1, 248/302, 303, 219.4, 211, 210; 182/133, 134

[56] References Cited

U.S. PATENT DOCUMENTS

| | | | |
|---|---|---|---|
| 141,498 | 8/1873 | Edmonston | 248/217.1 X |
| D. 261,984 | 11/1981 | Gunnells | 248/211 |
| 1,007,843 | 11/1911 | Botsford | 248/218.4 |
| 1,482,745 | 2/1924 | Heid | 182/134 X |
| 2,508,258 | 5/1950 | Heinrich | 248/211 |
| 3,272,467 | 9/1966 | Kassube | 248/211 |

FOREIGN PATENT DOCUMENTS 587182 10/1933 Fed. Rep. of Germany ...... 182/134
471298 of 1969 Switzerland ...................... 248/217.1

Primary Examiner—Karen J. Chotkowski
Attorney, Agent, or Firm—Millen, White & Zelano

[57] ABSTRACT

A mounting bracket for mounting on a vertical member such as a wall stud which may be dimensioned for example as a two by four or a two by six wherein the mounting bracket includes a mounting member which is generally U-shaped in configuration and has first and second legs joined by a bight. The bight has the long portion and a short portion which join one another at an angle of 22.5° which is a minimum angle while the legs of the U-shaped mounting member extend parallel to one another to form an angle of approximately 45° for the short leg with respect to the adjacent face of the stud. One of the legs of the U-shaped member is longer than the other and has fixed thereon a projection for supporting an article on the vertical member or stud while the other leg has a point projecting therefrom for penetrating the vertical member or stud.

18 Claims, 2 Drawing Sheets

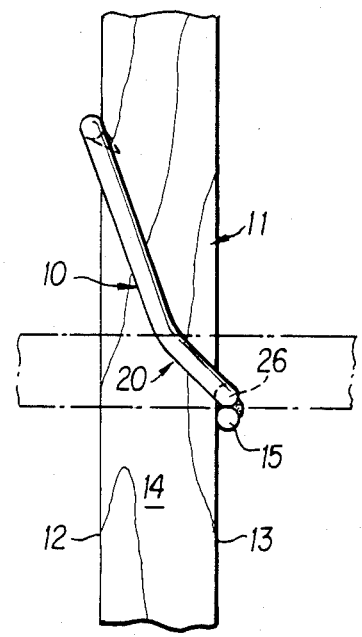
FIG. 5
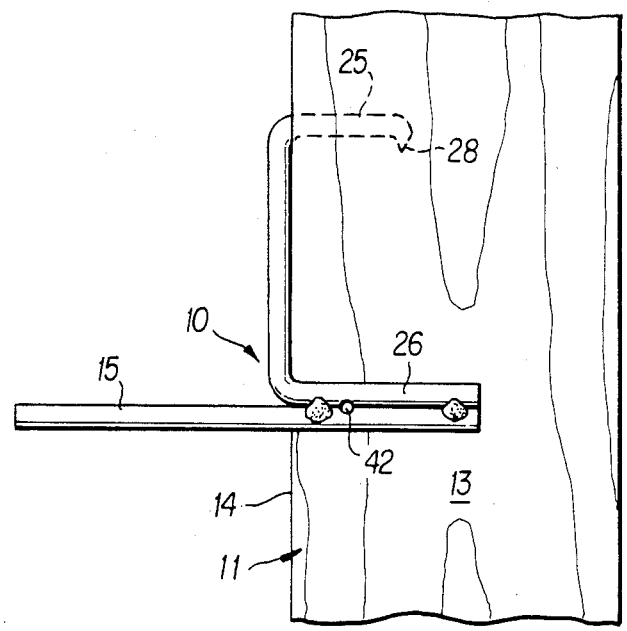
FIG. 6
FIG. 7
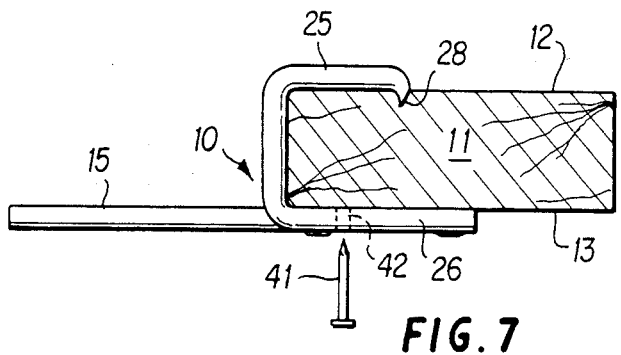
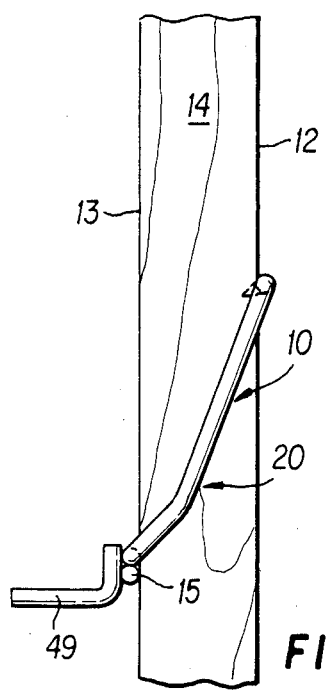
FIG. 9
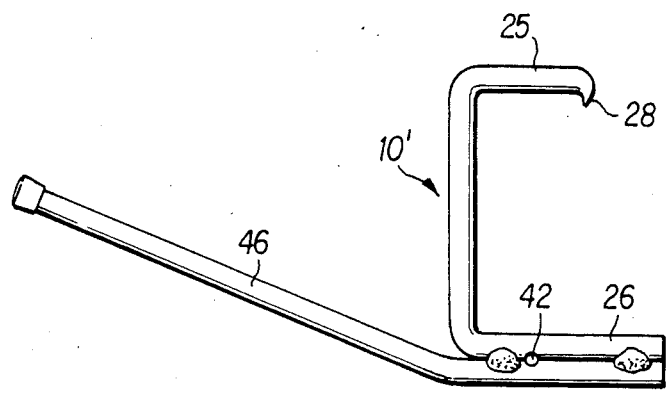
FIG. 8

ARTICLE FOR MOUNTING OBJECTS

BACKGROUND OF THE INVENTION

The instant invention is directed to an article for mounting objects. More particularly, the instant invention is related to an article for mounting objects on vertically extending construction members such as studs used in framing buildings or rooms.

Two by four and to lesser extent two by six lumber is used as studing in framing buildings throughout the United States and the world. There are many situations when studs are not covered by exterior walls such as in garages, sheds and buildings under construction. It is frequently necessary or desirable to hang objects such as tools, materials, tables, pipes, etc., upon studs for storage or perhaps to simply free floor space within a building. It has been the general practice to hang articles on studs by driving nails into the studs and using the nails as hooks. There are also a number of commercially available mounting brackets which are nailed to the sides or faces of studs to support various articles. To date, these approaches have not been very satisfactory because they are inconvenient haphazard and difficult to quickly change. Accordingly, there is a need for easier, more flexible approaches to mounting articles on studs.

SUMMARY OF THE INVENTION

It is an object of the instant invention to provide a new and improved article for mounting items on vertically disposed framing elements such as the studs utilized in building construction.

In view of this object and other objects, the instant invention contemplates a mounting bracket which is readily attachable to a vertically extending structural element such as a framing stud. The bracket is comprised of a U-shaped mounting element having first and second legs joined by a bite. The first leg is shorter than the second leg and has a point extending therefrom in a direction generally toward the second leg. The bite has a long portion and a short portion joined to the long portion at a bend in the bight. The bend is at an angle of not less than 22.5° degrees with respect to the axis of the long portion. An article retaining member projects from the long portion for supporting another article on the bracket.

In accordance with the principles of the instant invention, the article supporting member may assume a number of configurations such as, for example, a rod which projects generally in the direction of the second leg or a rod which projects in a direction normal to the extent of the second leg. Instead of being parallel to the second leg, the rod may be slanted upwardly toward the axis of the first leg so that articles retained on the rod will tend to slide toward the bite. The length of the rod may vary to suit the particular purpose intended and a plurality of brackets with similar rod members may cooperate for mounting shelves, pipes or cables on a series of vertical studs.

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views, and wherein:

FIG. 5 is a front view of the bracket of FIG. 1 shown mounting a shelf;

FIG. 6 is a side view showing the bracket of FIG. 1 mounted on a stud;

FIG. 7 is a top view showing the bracket of FIG. 1 being secured by a nail;

FIG. 8 is a side view showing a second embodiment of the instant invention wherein the mounting member is a bent rod; and FIG. 9 is a front view of a third embodiment of the invention wherein a pair of rod members, one projecting forwarding and one projecting sideways, are utilized to support articles on the mounting brackets.

DESCRIPTION OF THE PREFERRED EMBODIMENTS

Figure 1:
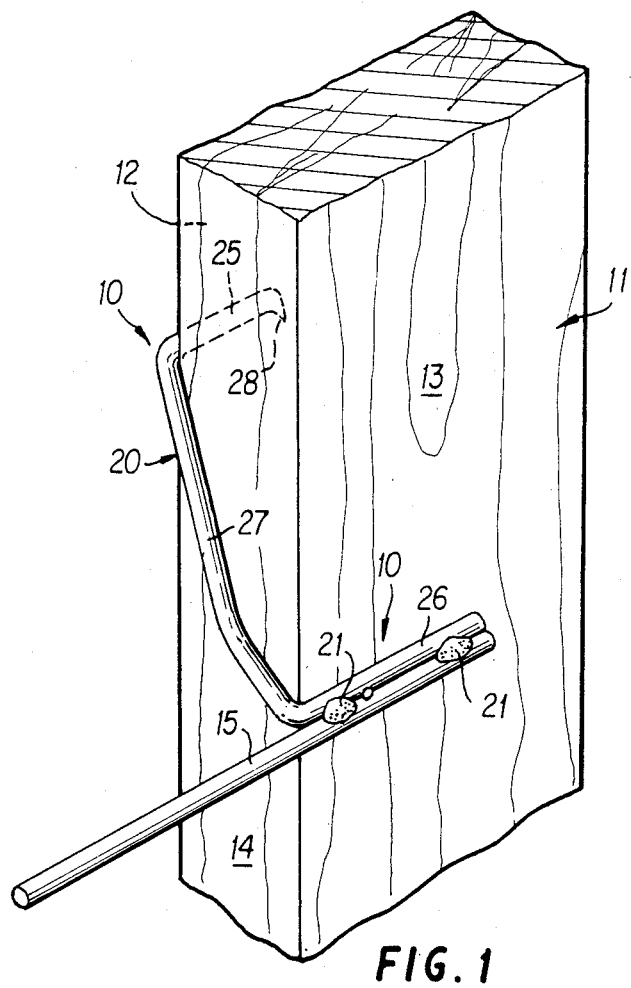
FIG. 1 is a perspective view of the bracket of the instant invention mounted on a vertical stud.
Figure 2:
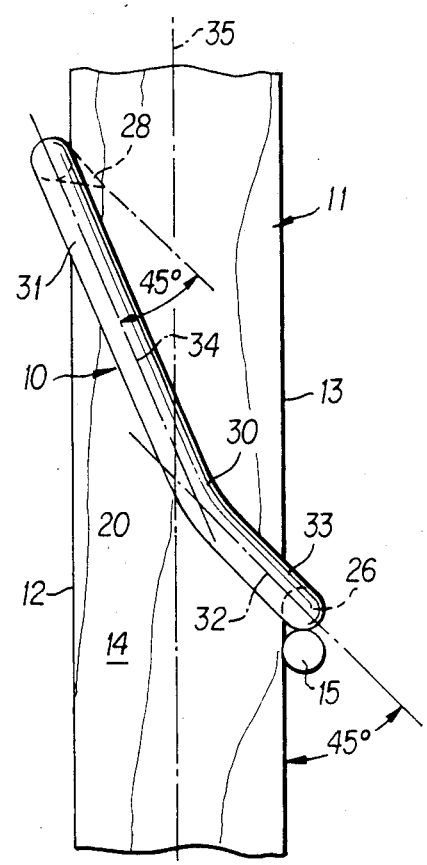
FIG. 2 is a front view of the bracketed FIG. 1 shown mounted on a stud.

Referring now to FIGS. 1–4, there is shown a mounting bracket, designated generally by the numeral 10, configured in accordance with the principles of the instant invention from steel rod having a diameter in the range of ¼ inch to ⅜ inch. In FIGS. 1 and 2, the mounting bracket 10 is shown mounted on a stud 11 such as a two by four or two by six which has a first face surface 12, a second face surface 13 and a third or side surface 14. Typically, the stud 11 is mounted so that the side surface 14 faces the room or framed enclosure while the first and second face surfaces face other studs in a wall. Typically, a room such as an unfinished basement, a garage or a shed will have a number of exposed studs on which the mounting bracket 10 may be mounted. Other situations in which studs 11 occur are in building sites and the like.

Mounting bracket 10 includes a projection 15 extending away from the side surface 14 of the stud so as to provide support outboard of the stud for hanging articles from the stud 11 or perhaps mounting structures such as shelves (see shelf A, FIG. 5) on a plurality of studs by supporting the shelves on at least two mounting brackets.

Referring now more specifically to the structure of the mounting bracket 10, it is seen the bracket includes two cooperating structures; one being a U-shaped bracket, designated generally by the numeral 20, and the other being the projecting rod or appendage 15 which is welded by welds 21 or otherwise secured to the U-shaped bracket. U-shaped bracket 20 has a particular configuration which allows the bracket to support itself on the studs and to support considerable weight applied to the rod 15. While a right handed bracket 10 is shown in the figures, the bracket may also be configured as a left handed bracket so that the rod 15 projects from face rather than face 13.

Figure 3:
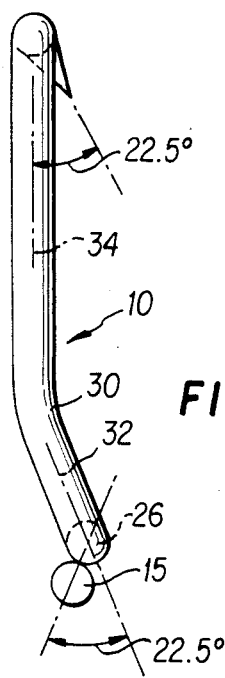
FIG. 3 is a front view of the bracket of FIG. 1 not mounted and showing the angular relationships of various components of the bracket.
Figure 4:
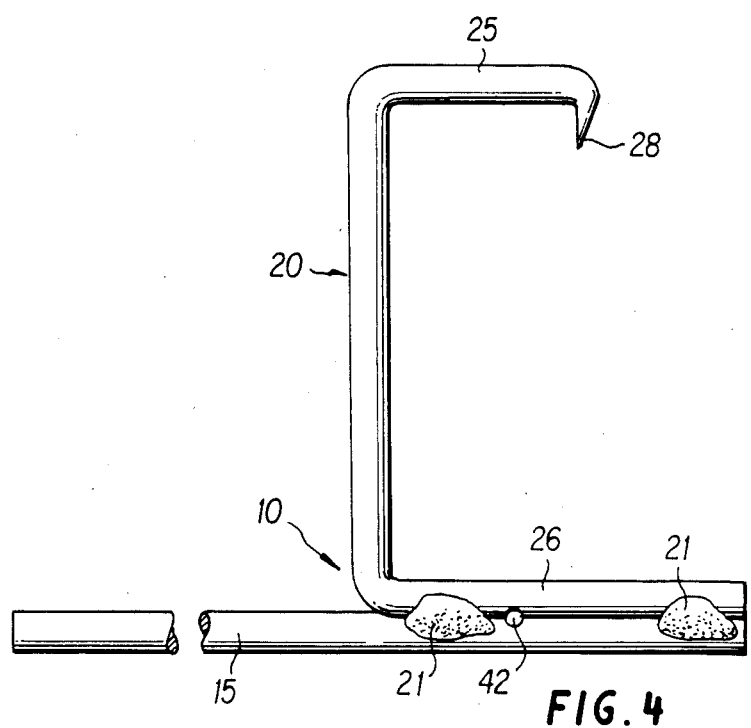
FIG. 4 is a side view of the bracket of FIG. 1.

The U-shaped mounting member 20 is comprised of a first leg 25, a second leg 26 and a bight 27 joining the first and second legs. As is seen in FIG. 4, the second leg 26 is considerably longer than the first leg and has the rod 15 fixed thereto. As is seen in FIGS. 2 and 3, the rod 15 extends parallel to the leg 26 and is attached to the second leg at a peripheral location so that the plane 30 which includes the axes 31 and 32 of the second leg 26 and rod 15 respectively is vertical when the bracket 10 is mounted. The short leg 25 has a projecting point 28 which preferably projects at an angle of + or −45°, depending on the length of bight 27, with respect to the first face 12 of the stud 11 and the bracket 10 is mounted.

In order to achieve the angular relationships shown in FIG. 2 so that the U-shaped mounting portion 20 of the bracket 10 seats firmly on the stud 11 and grips the stud 11 ever more tightly when weight is placed on rod 15, the bight 27 of the U-shaped mounting member has a bend 30 therein. The bend 30 divides the bight 27 into a long portion 31 and a short portion 32. The short portion 32 has an axis 33 which is at an angle of not less than 22.5° with respect to the axis 34 of the long portion 31. It is important that the long portion be long enough so that the bend 30 occurs closer to the second face 15 than the second face 12 when the bracket 10 is mounted. In other words, the bend 30 must occur across the center line 35 dividing the side face 14 of the stud 11 in half. It makes little difference how long the long portion 34 is with respect to the short portion 32 so long as when the bracket 10 is mounted, the bend 30 as defined in the illustrated embodiment by the intersections of axis 33 and 34, is closer to second face 13 than the first face 12.

In order to have the point 28 project at an approximate 45° angle into the first face 12 of the stud 11 (as is seen in FIG. 2), it is necessary that the point 28 project not less than 22.5° with respect to the axis 34 of the long portion 31 of bight 27 (as is seen in FIG. 3). Moreover, as is seen in FIG. 3, the axis 32 of the rod 15 is positioned 22.5° with respect to the imaginary extent of the axis 33 of the rod 32. Accordingly, the angular relationships shown in FIG. 2 always occur so that when weight is placed on rod 15, the point 28 digs into the first face 12 of the stud 11 while the portion of the bight 27 engaging the side face 14 and the portions of the long leg 26 and rod 15 engaging the second face 13 frictionally bind with the stud 11 to hold the mounting bracket 10 thereon with increasing force as weight on the bar 15 increases.

The mounting bracket 10 is mounted on a stud 11 by positioning the point 28 abutting the first face 12, long leg 26 abutting the second face 13 and bight 27 abutting side face 14. The bracket 10 is tilted at an angle of approximately 15 and then pulled down to make point 28 dig into the stud 11 while pushing the rod 15 down and back toward the stud. Thereafter, the mounting bracket 10 will hold any load which does not exceed the strength of the bracket itself or that of the two by four. When it is desired to move the bracket 10, all one need do is apply a slight force beneath the rod 15 to lift leg 26 and rod 15 away from the second face 13 of the stud 11. In that one can easily remove a mounting bracket 10 by hitting the bracket from the bottom, for some applications it may be prudent to further secure the bracket with a small nail 41 (FIG. 7) which is driven into the stud 11 through a bore 42 conveniently drilled between a long leg 26 and rod 15. In applications for construction sites and the like where there may be a tendency for the mounting brackets 10 to be hit from the bottom and where the mounting brackets are used to support pipes, cables and the like above floors, the extra safety of tacking the long leg 26 and rod 15 against the second face 13 of the two by four may well be a wise precaution.

Referring now specifically to FIG. 8, there is shown another embodiment of the invention wherein the rod 15 has a projecting portion 46 which is bent so that when the bracket, designated generally by the numeral 10′, is mounted on a stud 11 as is seen in FIG. 1, the bar portion forms a downwardly sloping surface so that articles mounted on the rod 46 tend to slide toward the mounting member 20 so that when the object is to be removed, it must be slid up the rod 46 or lifted in order to clear the end of the rod.

Referring now to FIG. 9, there is shown another embodiment of the invention wherein an additional projecting rod 49 extends at right angles to the rod 15 so as to provide another hook for hanging articles adjacent the first face 24 of the stud 11 in addition to the rod 15 extending normal to the side face 14 of the stud.

FIGS. 8 and 9 are illustrative of a number of additional embodiments wherein the configuration of the projecting members, such as the members 15 and 49 may assume a number of different configurations as long as the configuration does not conflict with the ability of the mounting member 20 to securely mount the projection on stud 11.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A mounting bracket for mounting articles on a wall stud, the mounting bracket comprising:
   a mounting member, the mounting member being generally U-shaped and including a first leg and a second leg extending in the same direction as the first leg and a bight joining the first leg and second leg, the first leg having a projection for penetrating a face of the vertically disposed member and the bight having a long portion extending from the first leg toward the second leg and a short portion joining the long portion at a supplementary angle thereto of not less than about 22.5° with respect to an extended imaginary axis of the long portion and connecting the second leg to the long portion of the bight, and
   means extending beyond the bight in a direction opposite the direction of extension of the second leg and being secured in juxtaposition with the second leg for mounting articles on the mounting bracket outboard of the stud.

2. The mounting bracket of claim 1, further including means for positively securing the second leg to the adjacent face of the vertical member when the mounting bracket is placed on the vertical member.

3. The mounting bracket of claim 2, wherein the securing means comprises a bore associated with the second leg through which a nail may be driven.

4. The mounting bracket of claim 1, wherein the means for mounting the article is a rod fixed to the second leg, the rod and second leg having axes which lie in a plane, the plane being at a 45° angle with respect to the axis of the short leg wherein when the mounting bracket is mounted on a vertically disposed member, both the second leg and the rod member abut the adjacent face of the vertically disposed member.

5. The mounting bracket of claim 4, wherein the rod member extends parallel to the second leg.

6. The mounting bracket of claim 5, wherein the rod member includes a portion bent generally in the plane including the axes of the rod member and second leg so as form an acute angle with the short portion of the bight wherein the rod member has a sloping surface with respect to the vertical member for securely retaining articles thereon.

7. The mounting member of claim 1, wherein the article mounting means including an additional projection which projects at an angle generally normal to the axis of the second leg.

8. The mounting bracket of claim 1, wherein the projection on the first leg extends at a maximum angle of 22.5° with respect to the axis of the long portion of the bight.

9. The mounting bracket of claim 1, wherein the second leg is longer than the first leg and extends parallel thereto.

10. A mounting bracket for mounting articles on a vertically disposed member such as a wall stud, the vertically disposed member having first and second parallel surfaces facing in opposite directions, joined by a third surface of a selected width extending perpendicular to the first and second surfaces, the mounting bracket comprising:

a mounting member, the mounting member being generally U-shaped and including a first substantially straight leg and a second substantially straight leg extending in the same direction as the first leg and a bight joining the first and second leg, the first leg having a projection for penetrating the first surface of the vertically disposed member and the bight having a long substantially straight portion extending from the first leg toward the second leg and a short substantially straight portion joining the long portion at a location selected to be closer to the second surface than the first surface of the vertically disposed member and at a supplementary angle thereto of not less than about 22.5°, the short leg being connected to the second leg and the second leg extending across the second surface; and means extending beyond the bight in a direction opposite the direction of extension of the first and second legs and being secured in juxtaposition with the second leg for mounting articles on the mounting bracket outboard of the third surface.

11. The mounting bracket of claim 10, further including means for positively securing the second leg to the adjacent face of the vertical member when the mounting bracket is placed on the vertical member.

12. The mounting bracket of claim 11, wherein the securing means comprises a bore associated with the second leg through which a nail may be driven.

13. The mounting bracket of claim 10, wherein the means for mounting articles is a rod fixed to the second leg, the rod and second leg having axes which lie in a plane, the plane being at a 45° angle with respect to the axis of the short leg wherein when the mounting bracket is mounted on a vertically disposed member, both the second leg and the rod member abut the second face of the vertically disposed member.

14. The mounting bracket of claim 13, wherein the rod member extends parallel to the second leg.

15. The mounting bracket of claim 14, wherein the rod member includes a portion bent generally in the plane including the axes of the rod member and second leg so as to form an acute angle with the short portion of the bight wherein the rod member has a sloping surface with respect to the vertical member for securely retaining articles thereon.

16. The mounting bracket of claim 10, wherein the article mounting means includes an additional projection which projects at an angle generally normal to the axis of the second leg.

17. The mounting bracket of claim 10, wherein the projection on the first leg extends at a maximum angle of 22.5° with respect to the axis of the long portion of the bight.

18. The mounting bracket of claim 10, wherein the second leg is longer than the first leg and extends parallel thereto.

* * * * *